United States Patent
Hu et al.

(10) Patent No.: US 12,206,487 B2
(45) Date of Patent: Jan. 21, 2025

(54) TRANSMISSION CONFIGURATION METHOD AND APPARATUS, COMMUNICATION NODE AND COMMUNICATION DEVICE

(71) Applicant: ZTE CORPORATION, Shenzhen (CN)

(72) Inventors: Linxi Hu, Shenzhen (CN); Wei Cao, Shenzhen (CN); Nan Zhang, Shenzhen (CN); Zhen Yang, Shenzhen (CN); Jianwu Dou, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 374 days.

(21) Appl. No.: 17/612,157

(22) PCT Filed: May 14, 2020

(86) PCT No.: PCT/CN2020/090137
§ 371 (c)(1),
(2) Date: Nov. 17, 2021

(87) PCT Pub. No.: WO2020/233482
PCT Pub. Date: Nov. 26, 2020

(65) Prior Publication Data
US 2022/0216912 A1    Jul. 7, 2022

(30) Foreign Application Priority Data
May 17, 2019    (CN) .......................... 201910413433.2

(51) Int. Cl.
*H04B 7/185*    (2006.01)
*H04W 56/00*    (2009.01)
*H04W 72/23*    (2023.01)

(52) U.S. Cl.
CPC ....... *H04B 7/18519* (2013.01); *H04B 7/1855* (2013.01); *H04W 56/0005* (2013.01); *H04W 56/0045* (2013.01); *H04W 72/23* (2023.01)

(58) Field of Classification Search
CPC .............. H04B 7/18519; H04B 7/1855; H04B 7/1853; H04W 56/0005; H04W 56/0045; H04W 72/23
See application file for complete search history.

(56) References Cited

U.S. PATENT DOCUMENTS 10,123,266 B2    11/2018    Wang et al.
10,306,671 B2    5/2019    Li et al.
(Continued)

FOREIGN PATENT DOCUMENTS

CN    102932892 A    2/2013
CN    107197517 A    9/2017
(Continued)

OTHER PUBLICATIONS

Chinese Office Action for Application No. 201910413433.2, dated May 24, 2022, 10 pages including translation.
(Continued)

*Primary Examiner* — Ayaz R Sheikh
*Assistant Examiner* — Tarell A Hampton
(74) *Attorney, Agent, or Firm* — Morgan, Lewis & Bockius LLP

(57) ABSTRACT

Provided are a transmission configuration method and apparatus, a communication node, a communication device and a computer-readable storage medium. The method includes steps described below, a communication node determines a downlink signaling indication for indicating a transmission configuration of a communication device, where the downlink signaling indication includes transmission state information, and the transmission state information includes
(Continued)

correction indication information; and the communication node sends the downlink signaling indication.

18 Claims, 4 Drawing Sheets

(56) References Cited

U.S. PATENT DOCUMENTS

| | | | | |
|---|---|---|---|---|
| 10,568,012 | B2* | 2/2020 | Wu | H04W 76/00 |
| 11,064,401 | B2* | 7/2021 | Xiong | H04W 36/0058 |
| 2012/0014371 | A1* | 1/2012 | Weng | H04J 3/0682 |
| | | | | 370/350 |
| 2016/0295532 | A1* | 10/2016 | Cao | H04W 56/001 |
| 2017/0367116 | A1 | 12/2017 | Li et al. | |
| 2019/0081825 | A1 | 3/2019 | Pajukoski et al. | |
| 2019/0254052 | A1* | 8/2019 | Liu | H04W 72/23 |

FOREIGN PATENT DOCUMENTS

| | | |
|---|---|---|
| CN | 107333241 A | 11/2017 |
| CN | 109005135 A | 12/2018 |
| CN | 109120561 A | 1/2019 |
| KR | 10-2019-0017995 A | 2/2019 |
| WO | WO-2018055512 A2 | 3/2018 |
| WO | WO-2018/195679 A1 | 11/2018 |
| WO | WO-2019038294 A1 | 2/2019 |

OTHER PUBLICATIONS

Chinese Search Report for Application No. 201910413433.2, dated May 16, 2022, 4 pages including translation.
Extended European Search Report of Application No. 20808990.4, dated Dec. 23, 2022, 8 pages.
Chinese Office Action for Application No. 2019104134332, dated Jun. 29, 2023, 12 pages including translation.
Chinese Supplemental Search Report for Application No. 2019104134332, dated Jun. 19, 2023, 5 pages including translation.
International Search Report for Application No. PCT/US2020/090137, dated Aug. 13, 2020, 4 pages including translation.
Zte, "Discussion on the TA and PRACH for NTN", *3GPP TSG RAN WG1 #96bis, R1-1904767*, Apr. 12, 2019 (Apr. 12, 2019), pp. 1-4, figure 4.
Korean Office Action for Application No. 10-2021-7041094 , dated Feb. 28, 2023, 8 pages including translation.

* cited by examiner

TRANSMISSION CONFIGURATION METHOD AND APPARATUS, COMMUNICATION NODE AND COMMUNICATION DEVICE

CROSS-REFERENCES TO RELATED APPLICATIONS

This is a National Stage Application, filed under 35 U.S.C. 371, of International Patent Application No. PCT/CN2020/090137, filed on May 14, 2020, which is based on and the claims priority to Chinese Patent Application No. 201910413433.2, filed with the China National Intellectual Property Administration (CNIPA) on May 17, 2019, disclosure of which is incorporated herein by reference in its entirety.

TECHNICAL FIELD

The present application relates to, but not limited to, a transmission configuration method and apparatus, a communication node, a communication device and a computer readable storage medium.

BACKGROUND

In a satellite communication scenario, due to the fast movement of a low earth orbiting (LEO) satellite base station relative to the earth, a Doppler frequency offset caused by the satellite mobility is experienced even if a ground terminal remains stationary.

In the current 3rd Generation Partnership Project Non Terrestrial networks Study Item (3GPP NTN SI) discussion, the general consensus is to correct for a frequency offset at a satellite base station side. Since the satellite base station operates periodically on a fixed satellite orbit, for a given beam, a relative speed of the satellite base station relative to a center point of a ground coverage region of a beam may be pre-calculated. A Doppler frequency offset experienced by a stationary user at a center point position of a corresponding ground coverage region of the beam may be calculated according to the relative speed. A transmitted downlink signal of the given beam is then corrected according to the calculated Doppler frequency offset, as shown in FIG. 1.

However, even if the base station performs the above Doppler frequency offset correction when transmitting a downlink signal, a user at a non-beam center point may still experience a large residual Doppler frequency offset, and the residual Doppler frequency offset may cause the uplink user interference when reaching the base station side in an uplink transmission thereof. In addition, due to a fact that a transmission distance between the satellite base station and the terminal is long, a time delay is too large, the terminal needs to adjust uplink transmission time advance (TA), and otherwise overlapping of time domain information may be caused, and thus the interference is generated.

SUMMARY

The following is a summary of subject matter that is described in detail herein. This summary is not intended to limit the protection scope of the claims.

The embodiments of the present disclosure provides a transmission configuration method and apparatus, a communication node, a communication device and a computer readable storage medium, so as to alleviate the user interference in an uplink reception.

An embodiment of the present disclosure provides a transmission configuration method. The transmission configuration method includes steps described below, a communication node determines a downlink signaling indication for indicating a transmission configuration of a communication device, where the downlink signaling indication includes transmission state information, and the transmission state information includes correction indication information; and the communication node sends the downlink signaling indication.

An embodiment of the present disclosure further provides a transmission configuration method. The transmission configuration method includes steps described below, a communication device receives a downlink signaling indication sent by a communication node; where the downlink signaling indication includes transmission state information, and the transmission state information includes correction indication information; and the communication device determines an uplink transmission mode according to the downlink signaling indication.

An embodiment of the present disclosure further provides a transmission configuration apparatus. The transmission configuration apparatus includes a first determination module and a sending module. The first determination module is configured to determine a downlink signaling indication for indicating a transmission configuration of a communication device, where the downlink signaling indication includes transmission state information, and the transmission state information includes correction indication information. The sending module is configured to send the downlink signaling indication.

An embodiment of the present disclosure further provides a transmission configuration apparatus. The transmission configuration apparatus includes a receiving module and a second determination module. The receiving module is configured to receive a downlink signaling indication sent by a communication node; where the downlink signaling indication includes transmission state information, and the transmission state information includes correction indication information. The second determination module is configured to determine an uplink transmission mode according to the downlink signaling indication, and the uplink transmission mode at least includes at least one of whether a correction is performed or whether a resource selection is performed.

An embodiment of the present disclosure further provides a communication node. The communication node includes a memory, a processor, and a computer program stored on the memory and executable on the processor, where the processor, when executing the computer program, implements the transmission configuration method.

An embodiment of the present disclosure further provides a communication device. The communication device includes a memory, a processor, and a computer program stored on the memory and executable on the processor, where the processor, when executing the computer program, implements the transmission configuration method.

An embodiment of the present disclosure further provides a computer readable storage medium. The computer readable storage medium stores computer-executable instructions, where the computer-executable instructions are used for performing the transmission configuration method.

The embodiments of the present disclosure includes the following steps. The communication node determines the downlink signaling indication for indicating the transmission configuration of the communication device, where the downlink signaling indication includes the transmission state information, and the transmission state information includes the correction indication information. Then, the communication node sends the downlink signaling indication. According to the embodiments of the present disclosure, the transmission state information is carried by the downlink signaling indication, so that the communication device may perform a correction according to the downlink signaling indication, whereby the multi-user interference or user's own inter-carrier interference (ICI) in an uplink reception is relieved, and thus the uplink reception performance is improved.

After the attached drawings and detailed descriptions are read and understood, other aspects may be understood.

DETAILED DESCRIPTION

Embodiments of the present disclosure will hereinafter be described in detail in conjunction with the accompanying drawings.

The steps shown in the flowcharts of the accompanying drawings may be performed in a computer system, such as a set of computer-executable instructions. Also, while a logical order is shown in the flowcharts, in some cases, steps shown or described may be performed in a different order than herein.

In a low-orbit satellite communication system, a Doppler frequency offset caused by high-speed motion of a satellite may affect the orthogonality of sub-carriers in an orthogonal frequency division multiplexing (OFDM) system, and a high reception performance of an uplink base station is required. In addition, a large Round-Trip Time (RTT) may have an impact on the system scheduling.

Even if the base station performs a Doppler frequency offset correction when transmitting a downlink signal, a terminal at a non-beam center point may still experience a large residual Doppler frequency offset. Especially for a terminal within a coverage range of a sub-satellite spot beam and a terminal moving at a high speed, the residual Doppler frequency offset may cause the uplink user self-interference and multi-user interference when the residual Doppler frequency offset reaches a base station side in an uplink transmission. In addition, since a long transmission distance between the satellite base station and the terminal is causes a excessive large time delay, the terminal needs to adjust uplink transmission time advance (TA), and otherwise overlapping of time domain information may be caused, and thus the interference is generated.

In the embodiments of the present disclosure, a communication node may transmit a corresponding signaling indication to a communication device by using a specific transmission configuration. After the communication device acquires this indication, the communication device may select an appropriate resource and an uplink transmission mode according to the signaling indication, its own capability and the like upon transmitting an uplink signal (for example, correction of an uplink frequency offset or no correction of an uplink frequency offset, or autonomous adjustment of the uplink transmission TA based on known information).

Figure 2:
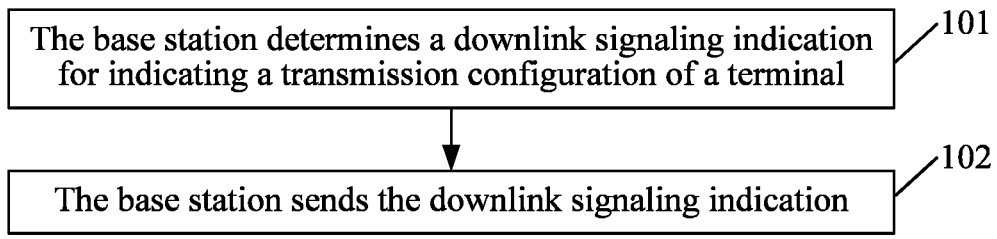
FIG. 2 is a flowchart of a transmission configuration method (applied to a communication node) according to an embodiment of the present disclosure.
Figure 3:
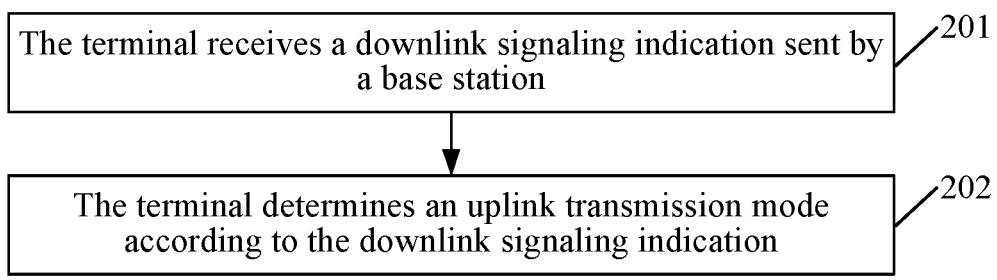
FIG. 3 is a flowchart of a transmission configuration method (applied to a communication device) according to an embodiment of the present disclosure.

As shown in FIG. 2, a transmission configuration method according to an embodiment of the present disclosure is applied to a communication node, and the transmission configuration method includes steps described below.

In step 101, the communication node determines a downlink signaling indication for indicating a transmission configuration of a communication device.

The downlink signaling indication includes transmission state information, and the transmission state information includes correction indication information.

The communication node may be a base station, such as a satellite base station.

The downlink signaling indication may be a frequency offset correction signaling indication, a TA adjustment signaling indication, and the like.

In an embodiment, the correction indication information includes correction state information. The correction state information is used for indicating one of: a correction is required, no correction is required, or whether to perform a correction is selected automatically. The correction being required means that: all communication devices receiving this indication need to perform a frequency offset/time offset self-estimation and correction.

No correction being required means that: all communication devices receiving this indication do not need to perform a frequency offset/time offset self-estimation and correction.

Whether to perform the correction being selected automatically means that: the communication device receiving this indication selects whether to perform a frequency offset/time offset self-estimation and correction according to its own condition.

In an embodiment, the correction state information is indicated in at least one of: a bitmap; a Ceil ($\log_2$ (N)) number of bits, where Ceil ( ) is a round-up function, and N is equal to a correction value contained in a correction state; or a state index.

The correction indication information may further include a correction value.

The correction value may include a frequency offset correction value and/or a time offset correction value.

When a transmission state includes both a frequency offset correction and a time offset correction, the correction state information may be configured for a frequency offset and a time offset, respectively, or may be shared.

The frequency offset correction value may be a preferred frequency offset correction value calculated by the communication node.

The time offset correction value may be a common TA adjustment value common to all communication devices.

The correction indication information may further include a correction value type, a correction accuracy and the like.

The correction value type may correspond to different conditions of the communication device, such as a position, a speed. The correction value type may be classified as follows: a correction value calculation reference point, a correction value corresponding communication device type, a correction value confidence, etc.

The correction accuracy may be set according to actual requirements.

In an embodiment, the transmission state information further includes transmission configuration information.

In an embodiment, the transmission configuration information includes uplink channel configuration information, and a correspondence between the uplink channel configuration information and the correction indication information.

The uplink channel configuration information may include Random Access Channel (RACH) configuration information, uplink transmission channel configuration information and uplink control channel configuration information.

The correspondence between the uplink channel configuration information and the correction indication information may include a correspondence between the uplink channel configuration information and the correction state, and a correspondence between the uplink channel configuration information and the correction value.

The RACH configuration information may include an uplink random access preamble format, a sub-carrier interval parameter, and the like.

The uplink channel configuration information being the RACH configuration information is used as an example, when corrected state information needs to be corrected, a corresponding RACH channel configuration information is a configuration A, and correspondingly, when the communication device sends an uplink signal, the configuration A is adopted for sending; when the corrected state information does not need to be corrected, a corresponding RACH channel configuration information is a configuration B, and correspondingly, when the communication device sends an uplink signal, the configuration B is adopted for sending; where the configuration B may be different from the configuration A. The corrected state information is whether to perform a correction being selected automatically, and correspondingly, the communication device selects whether to perform the frequency offset/time offset self-estimation and correction according to its own condition, and different configurations are applied to send uplink signals on respective appointed resources. If a correction is selected, the configuration A is applied, and an uplink signal is sent on an appointed resource of the configuration A; and if the correction is not selected, the configuration B is applied, and an uplink signal is sent on an appointed resource of the configuration B.

In an embodiment, the step 101 includes that: the communication node determines the transmission state information according to a geographic position of the communication device. For example, the communication device needs is determined to need to be corrected within a coverage range of a sub-satellite spot beam.

In an embodiment, the step 101 includes that: the communication node determines the transmission state information according to a motion state of the communication device. For example, a communication device moving at a high speed needs to be corrected.

In an embodiment, the step 101 includes that: the communication node determines the transmission state information according to a communication device capability reported by the communication device. For example, when the communication device reports that no corrected capability exists, the communication device is determined to not need to be corrected.

In an embodiment, the step 101 includes that: the communication node determines the transmission state information according to an identifier of a service network. The identifier of the service network may be used for distinguishing whether it is a satellite network or a ground network.

In an embodiment, the step 101 includes that: the communication node determines the correction indication information according to an uplink transmission mode and a corrected capability of the communication device, where the uplink transmission mode includes whether a correction is performed.

This step is applicable to a case that the communication device has reported corrected capability information, the communication node may learn the uplink transmission mode according to the uplink signal sent by the communication device, and then the communication node may determine whether the communication device performs a correction.

In step 102, the communication node sends the downlink signaling indication.

The communication node may send the downlink signaling indication in following manners.

Manner One: Broadcast Manner

The communication node sends the downlink signaling indication to a service region in the broadcast manner.

In this manner, the communication node indicates a communication device under a specific service range. The downlink signaling indication sent by the communication node may be applied to all users in the entire service region in the broadcast manner.

The service region may include a service region corresponding to a beam, a service region corresponding to a cell, and the like.

Manner Two: Unicast Manner

The communication node sends the downlink signaling indication to the communication device in the unicast manner.

The communication node may send the downlink signaling indication through dedicated control signaling for a specific communication device.

Manner Three: Multicast Manner

In this manner, the communication node sends the downlink signaling indication to the communication device in the multicast manner.

In an embodiment, the communication node divides a communication device group according to the geographic position of the communication device or the motion state of the communication device.

The communication node may send the downlink signaling indication through common control signaling for a specific communication device group (such as having a similar geographical position or similar motion state).

In an embodiment, the step in which the communication node sends the downlink signaling indication may include at least one of following operations.

1. The communication node separately sends a downlink signaling indication belonging to each target.
2. The communication node combines downlink signaling indications belonging to multiple targets for sending.

In an embodiment, configuration information of the downlink signaling indication corresponds to a target identifier of the target, and a correspondence manner includes at least one of: a resource position occupied by the downlink signaling indication corresponds to the target identifier; a data scrambling manner of the downlink signaling indication corresponds to the target identifier;

the downlink signaling indication includes a corresponding target identifier; or an order or a numbering of the downlink signaling indication corresponds to the target identifier.

For broadcast manner, the target may be a cell, a beam, etc. Therefore, the target identifier (ID) may be a cell ID, a synchronization signal/physical broadcast channel block (SSB) ID, and a channel state information reference signal (CSI-RS) resource ID.

For unicast manner, the target may be the communication device, a resource (such as a beam) serving the communication device, and the like. Therefore, the target ID may be a user ID, a SSB ID, a CSI-RS resource ID, and a sounding reference signal (SRS) resource ID.

For multicast manner, the target may be a specific grouping and the like, so the target ID may be a communication device group identifier The beam refers to a reference signal (such as SSB, CSI-RS, SRS) or a resource (space domain resource, antenna port number), or a quasi-co-location relationship.

In an embodiment, after the communication node sends the downlink signaling indication, the method further includes: receiving, by the communication node, an uplink signal sent by the communication device; and receiving, by the communication node, an uplink transmission mode of the communication device according to the uplink signal, where the uplink transmission mode includes whether a correction is performed.

In an embodiment, the step in which the communication node determines the uplink transmission mode of the communication device according to the uplink signal includes: determining, by the communication node, whether the communication device performs a correction according to an uplink channel resource occupied by the uplink signal.

For example, the RACH resource occupied by the uplink signal is the configured A, the communication device is determined to perform a correction, and the RACH resource occupied by the uplink signal is the configured B, the communication device is determined not to perform a correction.

In an embodiment, corrected capability information of the communication device is carried by the uplink signal, and the method further includes: the communication node determines whether the communication device has a capability of performing a correction according to the corrected capability information.

The communication node determines whether the communication device is capable of performing the correction, and determines corrected state information of the communication device according to whether the communication device performs the correction, so that the communication node may return to perform the steps 101 to 102 so as to determine and send the downlink signaling indication.

An embodiment of the present disclosure further provides a transmission configuration method applied to a communication device. The transmission configuration method includes steps described below.

In step 201, a communication device receives a downlink signaling indication sent by a communication node; where the downlink signaling indication includes transmission state information, and the transmission state information includes correction indication information.

The communication device may be a terminal.

The downlink signaling indication may be a frequency offset correction signaling indication, a TA adjustment signaling indication, and the like.

In an embodiment, the correction indication information includes correction state information. The correction state information is used for indicating one of: a correction is required, no correction is required, or whether to perform a correction is selected automatically.

The correction being required means that: all communication devices receiving this indication need to perform a frequency offset/time offset self-estimation and correction.

No correction being required means that: all communication devices receiving this indication do not need to perform a frequency offset/time offset self-estimation and correction.

Whether to perform the correction being selected automatically means that: the communication device receiving this indication selects whether to perform a frequency offset/time offset self-estimation and correction according to its own condition.

In an embodiment, the correction state information is indicated in at least one of: a bitmap; a Ceil ($\log_2$ (N)) number of bits, where Ceil ( ) is a round-up function, and N is equal to a correction value contained in a correction state; or a state index.

The correction indication information may further include a correction value.

The correction value may include a frequency offset correction value and/or a time offset correction value.

When a transmission state includes both a frequency offset correction and a time offset correction, the correction state information may be configured for a frequency offset and a time offset, respectively, or may be shared.

The frequency offset correction value may be a preferred frequency offset correction value calculated by the communication node.

The time offset correction value may be a common TA adjustment value common to all communication devices.

The correction indication information may further include a correction value type, a correction accuracy and the like.

The correction value type may correspond to different conditions of the communication device, such as a position, a speed. The correction value type may be classified as follows: a correction value calculation reference point, a correction value corresponding communication device type, a correction value confidence, etc.

The correction accuracy may be set according to actual requirements.

In an embodiment, the transmission state information further includes transmission configuration information.

In an embodiment, the transmission configuration information includes uplink channel configuration information, and a correspondence between the uplink channel configuration information and the correction indication information. The uplink channel configuration information may include Random Access Channel (RACH) configuration information, uplink transmission channel configuration information and uplink control channel configuration information.

The correspondence between the uplink channel configuration information and the correction indication information may include a correspondence between the uplink channel configuration information and the correction state, and a correspondence between the uplink channel configuration information and the correction value.

The RACH configuration information may include an uplink random access preamble format, a sub-carrier interval parameter, and the like.

The uplink channel configuration information being the RACH configuration information is used as an example, when corrected state information needs to be corrected, a corresponding RACH channel configuration information is a configuration A, and correspondingly, when the communication device sends an uplink signal, the configuration A is adopted for sending; when the corrected state information does not need to be corrected, a corresponding RACH channel configuration information is a configuration B, and correspondingly, when the communication device sends an uplink signal, the configuration B is adopted for sending; where the configuration B may be different from the configuration A. The corrected state information is whether to perform a correction being selected automatically, and correspondingly, the communication device selects whether to perform the frequency offset/time offset self-estimation and correction according to its own condition, and different configurations are applied to send uplink signals on respective appointed resources. If a correction is selected, the configuration A is applied, and an uplink signal is sent on an appointed resource of the configuration A; and if the correction is not selected, the configuration B is applied, and an uplink signal is sent on an appointed resource of the configuration B.

In step 202, the communication device determines an uplink transmission mode according to the downlink signaling indication.

The uplink transmission mode may include at least one of whether a correction is performed or whether a resource selection is performed.

In an embodiment, the step 202 includes that: the communication device determines the uplink transmission mode according to a corrected capability of the communication device and the correction indication information.

For example, when the correction state information indicates that a correction is needed and the corrected capability of the communication device may be corrected, the communication device performs a correction.

When the correction state information indicates that a correction is needed and the corrected capability of the communication device may not be corrected, the communication device does not perform a correction.

When the correction state information indicates that no correction is needed, the communication device does not perform a correction.

When the correction state information indicates that whether to perform a correction is selected automatically, and the corrected capability of the communication device may be corrected, the communication device may selectively perform or not perform a correction; and when the correction state information indicates that whether to perform a correction is selected automatically, and the corrected capability of the communication device may not be corrected, the communication device does not perform a correction.

For the frequency offset correction, the communication device may utilize a downlink frequency point received by the SSB to compare with a closest global synchronization grid absolute frequency point, a frequency difference between the downlink frequency point and the closest global synchronization grid absolute frequency point is calculated, and if a frequency offset estimation is performed, the communication device uses twice of the above frequency difference as an uplink frequency offset correction value to correct uplink transmission signals, so that the uplink transmission signals are aligned in a frequency domain when reaching a communication node side. If the frequency offset estimation is not performed, the frequency offset correction is not performed, and the uplink signal is directly transmitted. The communication device transmits uplink signals on corresponding uplink transmission resources according to the three states of the signaling indication.

In an embodiment, the method further includes that: the communication device determines an uplink transmission resource; and the communication device transmits an uplink signal through the uplink transmission resource according to the uplink transmission mode.

In an embodiment, the step in which the communication device determines the uplink transmission resource includes: the downlink signaling indication includes a set of transmission configuration information, and the communication device determines a corresponding uplink transmission resource according to the transmission configuration information; and the downlink signaling indication includes multiple sets of transmission configuration information, and the communication device selects one set of transmission configuration information among the multiple sets of transmission configuration information according to the uplink transmission mode and determines a corresponding uplink transmission resource.

The uplink transmission resource may be a RACH resource, a physical uplink shared channel (PUSCH) resource, or a physical uplink control channel (PUCCH) resource.

In an embodiment, the step in which the communication device selects the one set of transmission configuration information among the multiple sets of transmission configuration information according to the uplink transmission mode and determines the corresponding uplink transmission resource includes at least one of: the communication device selects a set of transmission configuration information according to the uplink transmission mode and the target identifier; or the communication device selects a first set of transmission configuration information as a default configuration of the uplink transmission.

The target identifier (ID) may be a cell identifier, a SSB identifier, a CSI-RS resource identifier, a terminal identifier, a terminal group identifier, a SRS resource identifier and an SRS resource index. In an embodiment, corrected capability information of the communication device is carried by the uplink signal.

The corrected capability information may be used for the communication node to determine whether the communication device has a capability to perform a correction, so that a subsequent downlink signaling indication is sent.

According to the embodiments of the present disclosure, the transmission state information is carried by the downlink signaling indication, so that the communication device may perform a correction according to the downlink signaling indication, whereby the multi-user interference or user's own ICI in an uplink reception is relieved, and thus the uplink reception performance is improved.

An example in which the communication node is the satellite base station and the communication device is the terminal is used below, and the frequency offset correction and the time offset correction are respectively explained.

1. Frequency Offset Correction

For a given beam, the satellite base station may calculate a Doppler frequency offset fd experienced by a stationary terminal at a center position of a ground coverage region of the beam, and when downlink signals are transmitted, a 2*fd Doppler frequency offset correction is performed on all downlink signals under the beam.

Figure 4:
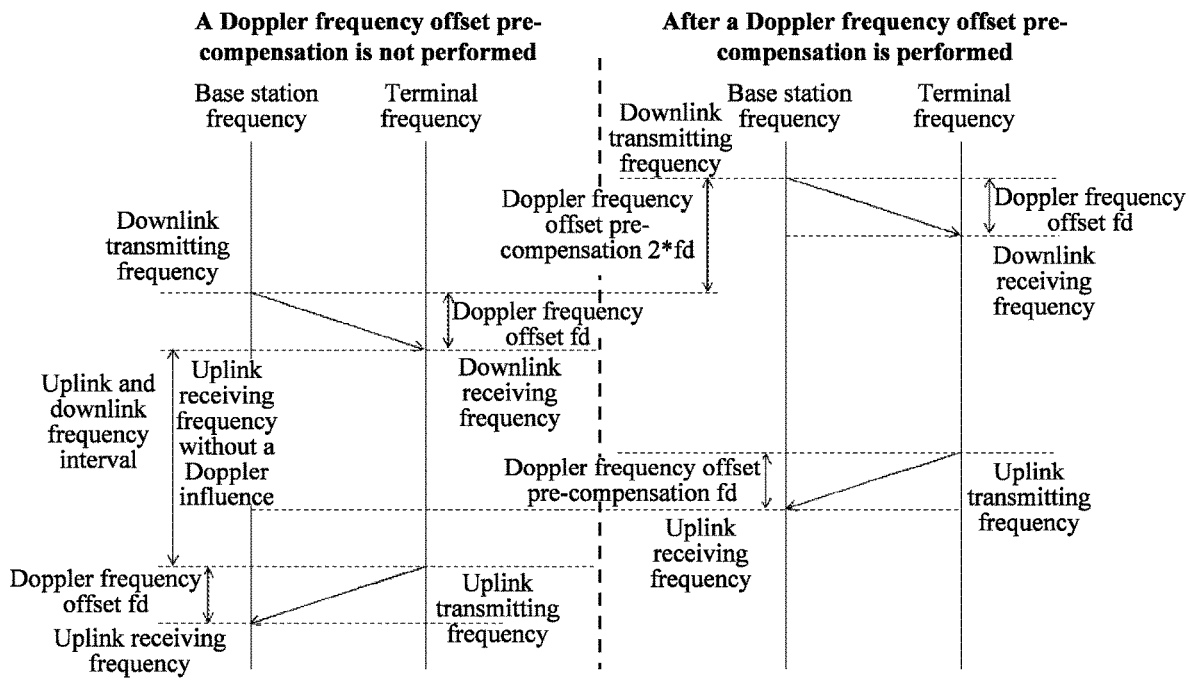
FIG. 4 is a diagram showing a comparison between a non-Doppler frequency offset correction and a double Doppler frequency offset correction on a communication node side according to an embodiment of the present disclosure.

As may be seen from FIG. 4, through 2*fd downlink Doppler frequency offset correction, the influence of Doppler frequency offset in an uplink receiving frequency of the base station is eliminated for a stationary terminal on a center point within a coverage range of a given beam.

For a terminal within a coverage range of a sub-satellite spot beam, the Doppler frequency offset is corrected to be zero, and a Doppler frequency offset of a terminal at the edge of this region is still likely to be large. For other beams with larger elevation angle, or for a terminal moving at a high speed (such as, aircraft terminal), a relatively large residual frequency offset may still exist after a Doppler frequency offset correction is performed in the above steps. Through the embodiments of the present disclosure, the residual frequency offset may be corrected by following steps.

In a first step, a base station indication (at this time, the downlink signaling indication is a frequency offset correction signaling indication) has three possible cases described as follows.

1, A beam-based frequency offset correction signaling indication is added into a downlink broadcast signal of the satellite base station, all terminals within a coverage of this beam are informed, and all terminals are required to perform, not perform or selectively perform a frequency offset estimation and an uplink frequency offset correction.

2, A base station-based frequency offset correction signaling indication is added into dedicated downlink control signaling of the satellite base station, the downlink control signaling is transmitted for this terminal, and the terminal is required to perform, not perform or selectively perform a frequency offset estimation and an uplink frequency offset correction.

3, A terminal group-based frequency offset correction signaling indication is added into common downlink control signaling of the satellite base station, the downlink control signaling is transmitted for a certain group of terminals, and all terminals in the terminal group are required to perform, not perform or selectively perform a frequency offset estimation and an uplink frequency offset correction.

In a second step, the terminal behavior specifically includes two operations.

1. The terminal receives the above-described three possible signaling indications, performs, not perform or selectively performs a frequency offset estimation. One feasible method includes following steps: a downlink frequency point received by the SSB is compared with a closest global synchronization grid absolute frequency point, and a frequency difference between the downlink frequency point and the closest global synchronization grid absolute frequency point.

2, If the frequency offset estimation is performed, the terminal uses twice of the above-described frequency difference as an uplink frequency offset correction value to correct uplink signals, so that the uplink signals are aligned in a frequency domain when reaching a base station side. If the frequency offset estimation is not performed, the frequency offset correction is not performed, and the uplink signal is directly transmitted. The terminal transmits uplink signals on corresponding RACH resources according to the three states of the signaling indication (similarly, for PUSCH/PUCCH, the uplink signal is transmitted on the PUSCH/PUCCH resource).

The base station side may also perform additional protection measures to prevent the uplink frequency offset correction of the terminal from being abnormal. One feasible method is as follows: if the base station side finds that the uplink frequency offset correction of a certain terminal is abnormal after receiving measurement, the base station needs to reserve a corresponding frequency domain protection interval when scheduling the terminal so as to avoid the uplink signal interference of the terminal to other terminals.

In a third step, the base station knows whether the terminal is corrected or not according to the signaling indication and a resource condition occupied by the received uplink signal, and transmits a downlink random access response (RAR). At this time, the downlink signaling indication is included in the downlink RAR. If an uplink signal is monitored on the corresponding resource, the terminal is instructed to perform or not perform the frequency offset correction in the RAR uplink grant (UL grant) of the downlink signaling indication, and the signaling content may include a correction value parameter. When the terminal is not in initial access, the base station assumes that the frequency offset is corrected, and performs operations such as subsequent resource allocation according to a signaling indication in the RAR UL grant.

2. Time Offset Correction

When a terminal is initially accessed, for a certain beam, the base station firstly transmits a TA adjustment signaling indication (at this time, the downlink signaling indication is the TA adjustment signaling indication) through a downlink broadcast, and all terminals are required to perform, not perform or selectively perform the time offset correction and a common TA adjustment value of the all terminals within a coverage range of the beam in the signaling indication.

The performing the time deviation correction refers to self-adjustment on the basis of the common TA adjustment value, and the not performing of the time deviation correction refers to using the common TA adjustment value as the TA adjustment value.

After receiving the indication, the terminal may perform one of following according to its own condition.

1, The common TA adjustment value is directly selected as the TA adjustment value, an uplink RACH signal is transmitted on a corresponding resource by applying a configuration B, and whether the uplink RACH signal has a self-adjustment capability is reported, where the configuration B correspondingly does not perform a correction.

2, A self-adjustment is selected on the basis of the common TA adjustment value, an uplink RACH signal is transmitted on a corresponding resource by applying a configuration A, whether the uplink RACH signal has a self-adjustment capability is reported, where the configuration A correspondingly performs a correction;

Factors influencing whether the self-adjustment is performed or not may be whether the terminal has the ability to calculate a difference value between an actual TA adjustment value and the common TA according to the position information, and may also be whether adjustment is needed or not after the terminal which has the ability to calculate the self-adjustment value pre-estimates an uplink synchronization error.

After receiving an uplink signal of a corresponding terminal, the base station acquires the adjustment capability of the terminal and whether the self-adjustment is performed.

The transmission state may be that (on the basis of the common TA as the TA adjustment value) a self-TA adjustment needs to be performed, a self-TA adjustment does not need to be performed, and a self-TA adjustment is selectively performed. It is also possible that the TA adjustment needs to be performed, the TA adjustment does not need to be performed, and the TA adjustment is selectively performed. The former refers to that the terminal needs to perform the TA adjustment, but whether the terminal performs the self-adjustment on the basis of the common TA is determined according to the signaling indication and the actual situation of the terminal, and the latter refers to that the terminal does not need to perform the TA adjustment (for example, the common TA may also not perform compensation), and whether the terminal performs the TA adjustment is determined according to the signaling indication and the actual situation of the terminal.

1. For a terminal with the self-adjustment capability and when the common TA may not satisfy the uplink synchronization error requirement, the base station may transmit a downlink signaling indication in a unicast or multicast manner to inform the terminal to perform a self-adjustment of the TA;
2. For a terminal with the self-adjustment capability and when the common TA may satisfy the uplink synchronization error requirement, the base station may transmit a downlink signaling indication in a unicast or multicast manner to inform the terminal to selectively perform a self-adjustment of the TA.
3. For a terminal without the self-adjustment capability and when the common TA may not satisfy the uplink synchronization error requirement, the base station recalculates a TA adjustment value required by the terminal, transmits a downlink signaling indication in a unicast or multicast manner, and informs the terminal that the TA does not need to be self-adjusted and an updated TA adjustment value in the signaling indication is used.
4. For a terminal without the self-adjustment capability and when the common TA may satisfy the synchronization error requirement, the base station may transmit a downlink signaling indication in a unicast or multicast manner to inform the terminal that a self-adjustment of the TA does not need to be performed.

During a non-initial access, the base station may perform the operation described above according to the known terminal capability and the terminal synchronization condition, and transmits a corresponding signaling indication in a downlink manner.

It should be noted that a common TA adjustment value of all terminals in the downlink signaling indication is not necessary, the base station may also instruct the terminal not to adjust the common TA adjustment value, and a manner of transmitting the downlink signaling indication by the base station may be a broadcast, unicast or multicast manner. The base station side takes corresponding measures according to the condition, for example, the receiving time window is delayed during receiving.

Some application examples are described below.

For satellite beam direction control, there are currently two manners: a moving beam and a steering beam. In the beam moving manner, the beam direction is static relative to the satellite, and the coverage region of the beam moves correspondingly along with the movement of the satellite; in the steering beam, the coverage region is static relative to the ground or a moving terminal group, and the beam direction changes along with the movement of the satellite. For different beam types, an applicable signaling indication manner may be selected.

Figure 1:
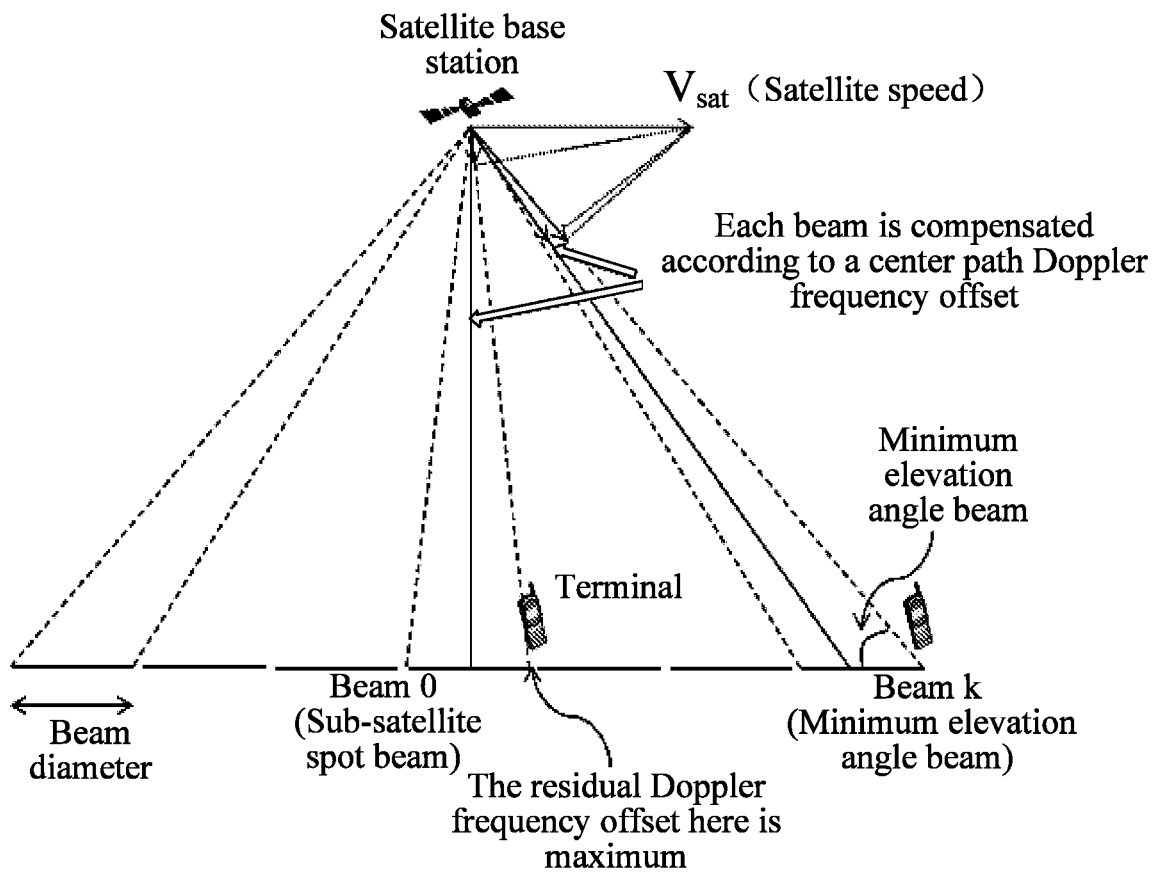
FIG. 1 is a diagram showing downlink Doppler frequency offset correction.

Application Example 1: A Low-Speed Terminal, a Non-Geostationary Orbit Satellite Base Station, a Moving Beam For the low-speed terminal, the Doppler frequency offset is mainly caused by the motion of the satellite. After 2*fd Doppler frequency offset correction is performed on downlink transmission signals of the base station, a maximum value of residual Doppler frequency offset is located at an edge of the sub-satellite spot beam, so that a condition of the sub-satellite spot beam is considered, and if the residual Doppler frequency offset of the condition may be corrected, the residual Doppler frequency offset may be corrected under other conditions. For the sub-satellite spot beam coverage region in the FIG. 1, the Doppler frequency offset on the base station side is corrected to be 0, the Doppler frequency offset experienced by the terminal on the edge of the coverage region is still large, and a maximum Doppler frequency offset of the sub-satellite spot beam under different conditions is given in the table 1.

TABLE 1

Maximum Doppler frequency offset of sub-satellite spot beam in different conditions

| | | Satellite orbit | | |
| --- | --- | --- | --- | --- |
| | | GEO | LEO-1200 | LEO-600 |
| | | Satellite height | | |
| | | 35786 km | 1200 km | 600 km |
| Satellite beam diameter | S band fc = 2 GHz | 300 km | 150 km | 70 km |
| Maximum Doppler frequency offset | | 0.01 kHz | 2.54 kHz | 2.68 kHz |
| Satellite beam diameter | Ka band fc = 20 GHz | 130 km | 40 km | 20 km |
| Maximum Doppler frequency offset | | 0.06 kHz | 6.78 kHz | 7.68 kHz |

As can be seen from the table, if the satellite base station selects LEO-600, the carrier is 2 GHz, and the sub-carrier interval is 5 kHz, the uplink signal frequency received by the satellite base station will include a frequency offset of 2.68*2=5.32 kHz in the worst case (an edge terminal of the sub-satellite spot beam in FIG. 1), so that sub-carrier misalignment may be caused, and the uplink reception performance is seriously affected.

Since the direction of the sub-satellite spot beam is kept unchanged in a case of the moving beam, a beam-based frequency offset correction signaling indication may be added into a downlink broadcast signal of the satellite base station, the state is "the frequency offset correction is needed", all terminals within the coverage of the beam are informed to perform the frequency offset estimation and the uplink frequency offset correction, and the uplink RACH signal is transmitted by applying the configuration A (similarly, for PUSCH/PUCCH, it is the PUSCH/PUCCH signal). The RACH signal is received on the resource appointed by the configuration A on the satellite base station side, and if an uplink signal is monitored on the corresponding resource, then the signaling in the RAR UL grant instructs the terminal to perform the frequency offset correction.

When a frequency range is below 3 GHz, a minimum frequency interval between frequency points of the global synchronization grid is 50 kHz, when the frequency range is 3 GHz to 24.25 GHz, the frequency interval is 1.44 MHz, when the frequency range is 24.25 GHz to 100 GHz, the frequency interval is 1.72 MHz, and the maximum residual Doppler frequency offset is 7.68 kHz, so that the residual frequency offset may be calculated by comparing the downlink frequency point received by the SSB with the closest global synchronization grid, so that the uplink frequency offset correction is performed.

Application Example 2: A Stationary Terminal, a Non-Geostationary Orbit Satellite Base Station, a Steering Beam For a stationary terminal within a coverage range of the steering beam, since the beam coverage region is unchanged relative to the ground, the elevation angle of the beam changes gradually with the movement of the satellite. In this case, after a downlink Doppler frequency offset correction is performed on the satellite base station side, a large residual frequency offset still exists. Therefore, the satellite base station may transmit selective frequency offset correction indication in a downlink manner, and an uplink frequency offset correction indication may be performed in following three manners.

a. A beam-based frequency offset correction signaling indication may be added into downlink broadcast signaling of the satellite base station, all terminals covered by the beam are informed, and a frequency offset estimation and an uplink frequency offset correction are selectively performed; if the correction is performed, the configuration A is applied and an uplink RACH signal is transmitted on its designated resource (similarly, for PUSCH/PUCCH, it is the PUSCH/PUCCH signal); if the correction is not performed, the configuration B is applied and the uplink RACH signal is transmitted on its designated resource.

b. Assume that the satellite base station performs a data transmission for a single terminal by using a narrow beam (spot beam), then a frequency offset correction signaling indication based on the terminal may be added into dedicated downlink control signaling of the satellite base station. Downlink control signaling is transmitted for this terminal, and the terminal is required to selectively perform the frequency offset estimation and the uplink frequency offset correction. If the correction is performed, the configuration A is applied and an uplink signal is transmitted on the resource A; if the correction is not performed, the configuration B is applied and an uplink signal is transmitted on the resource B.

c. Assume that the geographic position of the terminal is known to the satellite base station, then the satellite base station may group the terminals based on the geographic position. A frequency offset correction signaling indication based on the terminal group is added into a common downlink control signaling of the satellite base station. The downlink control signaling is transmitted for a certain group of terminals (for example, the geographical position is close and the residual frequency offset is possibly relatively large), and all terminals within the terminal group are required to selectively perform the frequency offset estimation and the uplink frequency offset correction. If the correction is executed, the configuration A is applied and an uplink signal is transmitted on an appointed resource of the configuration A; if the correction is not performed, the configuration B is applied and an uplink signal is transmitted on its appointed resource.

The correction indication information described above may be determined according to a fact that a motion state of the terminal is static, the beam direction control manner is the steering beam, and the service network is an NTN network. The target identifier corresponding to the above transmission configuration may be a cell identifier, a terminal identifier, a terminal group identifier, a synchronization signal block (SSB) identifier, an SRS resource identifier and the like.

The satellite base station side receives the uplink signals on different specified resources, respectively, and if uplink signals are monitored on corresponding resources, then the signaling in the RAR UL grant instructs the terminal to perform or not perform the frequency offset correction.

The terminal frequency offset estimation method and the uplink frequency offset correction method are the same as the application example 1.

Application Example 3: A High-Speed Terminal (1000 km/s), a Non-Geostationary Orbit Satellite Base Station, a Moving Beam or a Steering Beam For a high-speed terminal, no matter under a coverage range of the moving beam or the steering beam, the Doppler frequency offset caused by the motion of the satellite base station needs to be considered in addition to the Doppler frequency offset caused by the motion of the satellite base station. After 2*fd Doppler frequency offset correction is performed on the satellite base station side, the residual Doppler frequency offset is caused by the common motion of the terminal and the satellite base station.

The signaling indication state of downlink transmission of the satellite base station should be "frequency offset correction is needed", and the uplink frequency offset correction indication may be performed in following two manners.

a. Assume that the satellite base station performs a data transmission for a single terminal by using a narrow beam (spot beam), then a frequency offset correction signaling indication based on the terminal may be added into dedicated downlink control signaling of the satellite base station. Downlink control signaling is transmitted for this terminal, and the terminal is required to perform the frequency offset estimation and the uplink frequency offset correction, and the configuration A is applied to transmit the uplink signal.

b. Assume that the satellite base station has known the motion state (such as a speed) of the terminal, then the satellite base station may group the terminals based on the motion state of the terminal. A frequency offset correction signaling indication based on the terminal group is added into a common downlink control signaling of the satellite base station. The downlink control signaling is transmitted for a certain group of terminals (for example, the speed is close and the residual frequency offset is possibly relatively large), and all terminals within the terminal group are required to perform the frequency offset estimation and the uplink frequency offset correction, and the configuration A is applied and an uplink signal is transmitted on its appointed resource.

The satellite base station side receives the RACH signal (similarly, for PUSCH/PUCCH, it is the PUSCH/PUCCH signal) on the resource appointed by the configuration A, and if uplink signals are monitored on corresponding resources, then the signaling in the RAR UL grant instructs the terminal to perform the frequency offset correction.

The terminal frequency offset estimation method and the uplink frequency offset correction method are the same as the application example 1.

Application Example 4: Coexistence of Terminals with Large Height Difference (e.g., Ground Terminal and High-Altitude Terminal (10 km))

For the ground terminal and the high-altitude terminal, due to different heights, the time delay relative to the satellite base station is also different. During initial access, the base station may include two common TA adjustment values in the downlink signaling indication, corresponding time offset correction value types are marked for the two TA adjustment values. The terminal selects a corresponding common TA adjustment value according to its condition, and whether the self-adjustment is performed on the basis of the common TA adjustment value, an uplink RACH signal (similarly, for PUSCH/PUCCH, it is the PUSCH/PUCCH signal) is transmitted on the corresponding resource, and whether it has self-adjustment capability is reported.

According to the uplink signal of the terminal, the base station knows a time offset correction value type corresponding to the TA adjustment value of the terminal, whether the terminal has the self-adjustment capability of the TA adjustment value, and whether the self-adjustment is performed. The base station performs one of following according to the synchronization error condition.

a) A downlink signaling indication is transmitted to a terminal with an error exceeding a threshold value and with a self-adjustment capability in a unicast or multicast manner, and the terminal is informed to perform the self-adjustment on a common TA adjustment value.

b) A terminal with an error exceeding the threshold value and without the self-adjustment capability, a downlink signaling indication is transmitted in a unicast or multicast manner, the terminal is informed that the self-adjustment is not needed, and a TA adjustment value updated by the base station is used.

c) A terminal with an error not exceeding the threshold value, a downlink signaling indication is transmitted in a unicast or multicast manner, and the terminal is informed that the self-adjustment is not needed, and a common TA adjustment value is directly used.

During a non-initial access, the base station may perform the above operations according to the known terminal capability and the terminal synchronization condition, and transmits corresponding signaling indication in a downlink manner.

Figure 5:
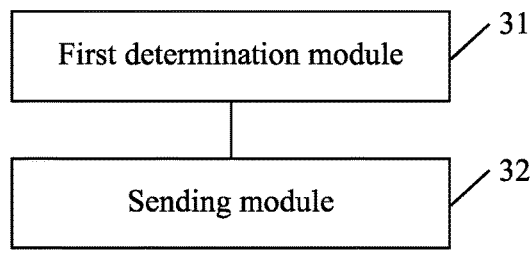
FIG. 5 is a schematic diagram of a transmission configuration apparatus (applied to a communication node) according to an embodiment of the present disclosure.

As shown in FIG. 5, an embodiment of the present disclosure further provides a transmission configuration apparatus applied to a communication node. The transmission configuration apparatus includes a first determination module 31 and a sending module 32. The first determination module 31 is configured to determine a downlink signaling indication for indicating a transmission configuration of a communication device, where the downlink signaling indication includes transmission state information, and the transmission state information includes correction indication information. The sending module 32 is configured to send the downlink signaling indication.

In an embodiment, the correction indication information includes correction state information.

In an embodiment, the correction indication information may further include a correction value.

In an embodiment, the transmission state information further includes transmission configuration information.

In an embodiment, the transmission configuration information includes uplink channel configuration information, and a correspondence between the uplink channel configuration information and the correction indication information.

In an embodiment, the first determination module 31 is configured to determine the transmission state information according to a geographic position of the communication device In an embodiment, the first determination module 31 is configured to determine the transmission state information according to a motion state of the communication device In an embodiment, the first determination module 31 is configured to determine the transmission state information according to a communication device capability reported by the communication device.

In an embodiment, the first determination module 31 is configured to determine the transmission state information according to an identifier of a service network In an embodiment, the first determination module 31 is configured to determine the correction indication information according to an uplink transmission mode and a corrected capability of the communication device, where the uplink transmission mode includes whether a correction is performed.

In an embodiment, the sending module 32 is configured to send the downlink signaling indication to a service region in a broadcast manner.

In an embodiment, the sending module 32 is configured to send the downlink signaling indication to the communication device in a unicast manner.

In an embodiment, the sending module 32 is configured to send the downlink signaling indication to the communication device in a multicast manner.

In an embodiment, the apparatus further includes a receiving module configured to receive an uplink signal sent by the communication device.

The first determination module 31 is further configured to determine the uplink transmission mode of the communication device according to the uplink signal, where the uplink transmission mode includes whether a correction is performed.

In an embodiment, the first determination module 31 is configured to determine whether the communication device performs a correction according to an uplink channel resource occupied by the uplink signal.

In an embodiment, the first determination module 31 is further configured so that the communication node determines whether the communication device has a capability of performing a correction according to the corrected capability information.

Figure 6:
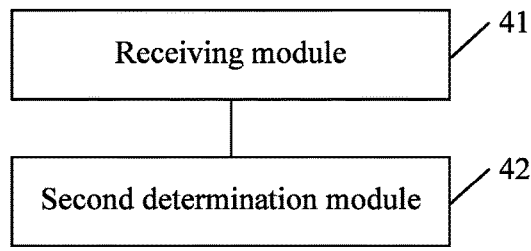
FIG. 6 is a schematic diagram of a transmission configuration apparatus (applied to a communication device) according to an embodiment of the present disclosure.

As shown in FIG. 6, an embodiment of the present disclosure further provides a transmission configuration apparatus applied to a communication device. The transmission configuration apparatus includes a receiving module 41 and a second determination module 42. The receiving module 41 is configured to receive a downlink signaling indication sent by a communication node; where the downlink signaling indication includes transmission state information, and the transmission state information includes correction indication information. The second determination module 42 is configured to determine an uplink transmission mode according to the downlink signaling indication.

In an embodiment, the correction indication information includes correction state information.

In an embodiment, the correction indication information may further include a correction value.

In an embodiment, the transmission state information further includes transmission configuration information.

In an embodiment, the transmission configuration information includes uplink channel configuration information, and a correspondence between the uplink channel configuration information and the correction indication information.

In an embodiment, the second determination module 42 is configured to determine the uplink transmission mode according to its own corrected capability and the correction indication information.

In an embodiment, the second determination module 42 is further configured to determine an uplink transmission resource.

The apparatus further includes a transmission module configured to transmit an uplink signal through the uplink transmission resource according to the uplink transmission mode.

In an embodiment, corrected capability information of the communication device is carried by the uplink signal.

Figure 7:
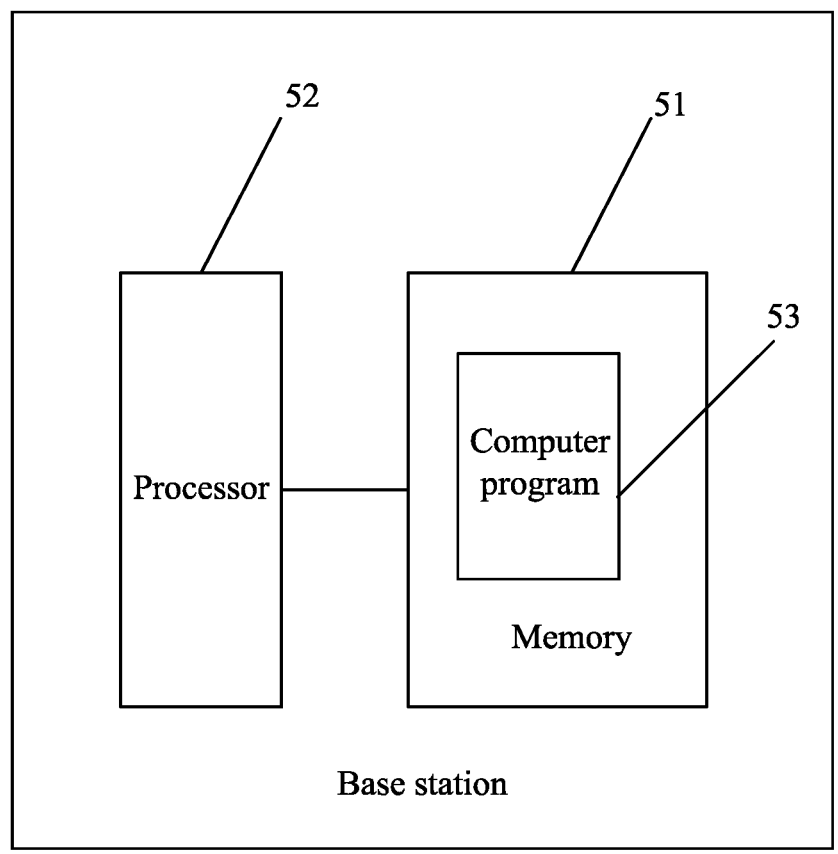
FIG. 7 is a schematic diagram of a communication node according to an embodiment of the present disclosure.

As shown in FIG. 7, an embodiment of the present disclosure further provides a communication node. The communication node includes a memory 51, a processor 52, and a computer program 53 stored on the memory 51 and executable on the processor 52, where the processor 52, when executing the computer program, implements the transmission configuration method.

Figure 8:
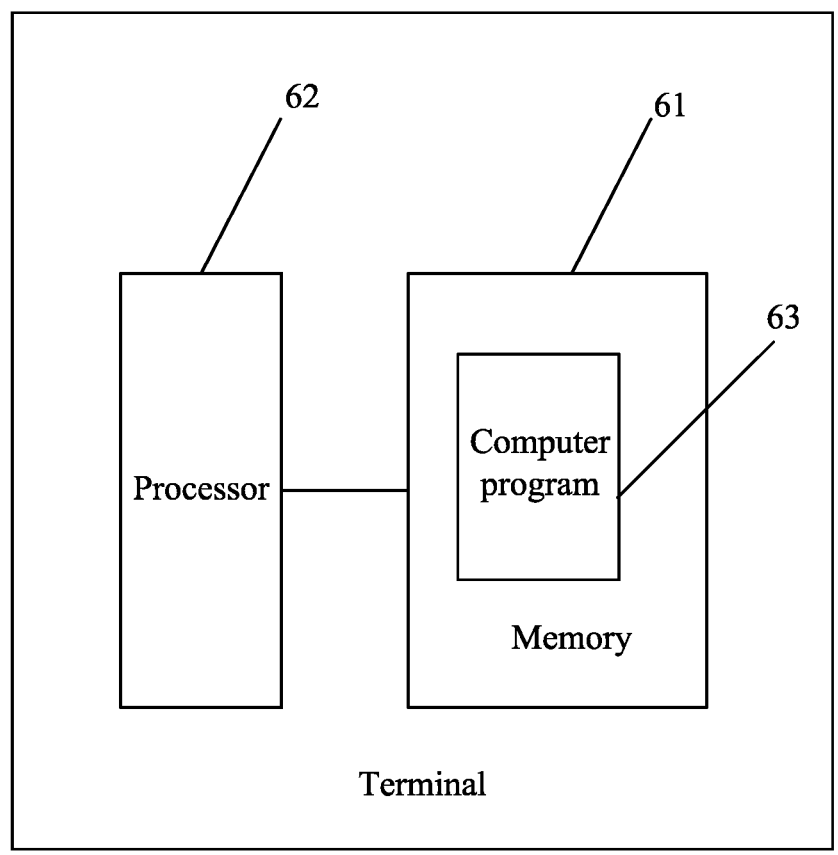
FIG. 8 is a schematic diagram of a communication device according to an embodiment of the present disclosure.

As shown in FIG. 8, an embodiment of the present disclosure further provides a communication device. The communication device includes a memory 61, a processor 62, and a computer program 63 stored on the memory 61 and executable on the processor 62, where the processor 62, when executing the computer program, implements the transmission configuration method.

An embodiment of the present disclosure further provides a computer readable storage medium. The computer readable storage medium stores computer-executable instructions, where the computer-executable instructions are used for performing the transmission configuration method.

In this embodiment, the storage medium described above may include, but is not limited to, a USB flash drive, a read-only memory (ROM), a random access memory (RAM), a removable hard disk, a magnetic disk, an optical disc, or any other medium capable of storing a program code.

It should be understood by those of ordinary skill in the art that all or some of the steps in the methods, systems, functional modules/units in the apparatus disclosed above may be implemented as software, firmware, hardware, and suitable combinations thereof. In a hardware implementation, the division between functional modules/units mentioned in the above description does not necessarily correspond to the division of physical assemblies; for example, one physical component may have multiple functions or one function or step may be performed by several physical assemblies in cooperation. Some or all of the assemblies may be implemented as software executed by a processor, such as a digital signal processor or a microprocessor, or as hardware, or as an integrated circuit such as an application specific integrated circuit. Such software may be distributed on computer-readable media, which may include computer storage media (or non-transitory media) and communication media (or transitory media). As is well known to those of ordinary skill in the art, the term "computer storage media" includes volatile and nonvolatile, removable and non-removable media implemented in any method or technology for storage of information (such as computer-readable instructions, data structures, program modules or other data). The computer storage media include, but are not limited to, a RAM, a ROM, an EEPROM, a flash memory or other memory technology, a CD-ROM, a DVD, or other optical disk storage, a magnetic cassette, a magnetic tape, a magnetic disk storage or other magnetic storage devices, or any other medium which may be used for storing the desired information and which may be accessed by a computer. Further, as is well known to those of ordinary skill in the art, the communication media typically embodies a computer-readable instruction, a data structure, a program module, or other data in a modulated data signal such as a carrier wave or other transport mechanism, and may include any information delivery media.

What is claimed is:

1. A transmission configuration method, comprising:
   determining, by a communication node, a downlink signaling indication for indicating a transmission configuration of a communication device, wherein the downlink signaling indication comprises transmission state information, and the transmission state information comprises correction indication information; and
   sending, by the communication node, the downlink signaling indication,
   wherein after sending, by the communication node, the downlink signaling indication, the method further comprises:
   receiving, by the communication node, an uplink signal sent by the communication device; and
   determining, by the communication node, an uplink transmission mode of the communication device according to the uplink signal, wherein the uplink transmission mode comprises at least one of whether a correction is performed or whether a resource selection is performed; and
   wherein the determining, by the communication node, the uplink transmission mode of the communication device according to the uplink signal comprises:
   determining, by the communication node, whether the communication device performs a correction according to an uplink channel resource occupied by the uplink signal.

2. The method of claim 1, wherein the transmission state information further comprises transmission configuration information.

3. The method of claim 2, wherein the transmission configuration information comprises uplink channel configuration information, and a correspondence between the uplink channel configuration information and the correction indication information.

4. The method of claim 1, wherein the determining, by the communication node, the downlink signaling indication for indicating the transmission configuration of the communication device comprises:
   determining, by the communication node, the transmission state information according to a geographic position of the communication device.

5. The method of claim 1, wherein the determining, by the communication node, the downlink signaling indication for indicating the transmission configuration of the communication device comprises:
   determining, by the communication node, the correction indication information according to an uplink transmission mode and a corrected capability of the communication device, wherein the uplink transmission mode comprises at least one of whether a correction is performed or whether a resource selection is performed.

6. The method of claim 1, wherein the sending, by the communication node, the downlink signaling indication comprises:
   sending, by the communication node, the downlink signaling indication at least in one of the following manners:

to a service region in a broadcast manner, to the communication device in a unicast manner, or to a communication device group in a multicast manner.

7. The method of claim 1, wherein corrected capability information of the communication device is carried in the uplink signal, and the method further comprises:

determining, by the communication node, whether the communication device has a capability of performing a correction according to the corrected capability information.

8. A transmission configuration method, comprising:

receiving, by a communication device, a downlink signaling indication sent by a communication node, wherein the downlink signaling indication comprises transmission state information, and the transmission state information comprises correction indication information;

determining, by the communication device, an uplink transmission mode according to the downlink signaling indication; and sending, by the communication device, an uplink signal to the communication node to enable the communication node to determine an uplink transmission mode of the communication device according to the uplink signal, wherein the uplink transmission mode comprises at least one of whether a correction is performed or whether a resource selection is performed, and wherein sending, by the communication device, the uplink signal to the communication node to enable the communication node to determine the uplink transmission mode of the communication device according to the uplink signal comprises:

sending, by the communication device, the uplink signal to the communication node to enable the communication node to determine whether the communication device performs a correction according to an uplink channel resource occupied by the uplink signal.

9. The method of claim 8, wherein the transmission state information further comprises transmission configuration information.

10. The method of claim 9, wherein the transmission configuration information comprises uplink channel configuration information, and a correspondence between the uplink channel configuration information and the correction indication information.

11. The method of claim 8, wherein determining, by the communication device, the uplink transmission mode according to the downlink signaling indication comprises:

determining, by the communication device, the uplink transmission mode according to a corrected capability of the communication device and the correction indication information.

12. The method of claim 11, further comprising:

determining, by the communication device, an uplink transmission resource; and transmitting, by the communication device, an uplink signal through the uplink transmission resource according to the uplink transmission mode.

13. The method of claim 12, wherein the uplink signal carries corrected capability information of the communication device.

14. A non-transitory computer readable storage medium, storing computer-executable instructions, wherein the computer-executable instructions are for performing the transmission configuration method of claim 1.

15. The method of claim 1, wherein the correction indication information comprises correction state information.

16. The method of claim 15, wherein the correction indication information further comprises a correction value.

17. The method of claim 8, wherein the correction indication information comprises correction state information.

18. The method of claim 17, wherein the correction indication information further comprises a correction value.

\* \* \* \* \*